A. A. MacDONALD.
NUT LOCK.
APPLICATION FILED AUG. 19, 1911.

1,052,679.

MODEL.

Patented Feb. 11, 1913.

Witnesses

Inventor
Archibald A. MacDonald.

UNITED STATES PATENT OFFICE.

ARCHIBALD A. MacDONALD, OF NEW GLASGOW, NOVA SCOTIA, CANADA.

NUT-LOCK.

1,052,679. Specification of Letters Patent. Patented Feb. 11, 1913.

Application filed August 19, 1911. Serial No. 645,031. (Model.)

*To all whom it may concern:*

Be it known that I, ARCHIBALD A. MAC-DONALD, of the town of New Glasgow, in the Province of Nova Scotia and Dominion of Canada, have invented certain new and useful Improvements in Nut-Locks, of which the following is a full, clear, and exact description.

This invention relates to improvements in lock nuts and bolts therefor, and the object is to provide a simple and inexpensive means by which nuts may be readily held against loosening on the bolts which carry them.

A further object is to provide a device of this character having no additional parts or attachments, and so arranged that either a nut or bolt may be used with ordinary bolts or nuts.

A still further object is to provide a co-operating nut and bolt which will be as strong or stronger than the ordinary nuts and bolts.

Another object is to provide a nut so constructed that when it is forced off the bolt, it will press the bolt into such form that a nut may be readily started by hand.

To accomplish these objects, I provide a bolt having the threaded end thereof recessed, and sawed or otherwise separated into a plurality of fingers which may be expanded by a suitable tool into a recess formed in the outer portion of the nut. This recess in the nut is so shaped that when the nut is forcibly removed from the bolt, it will compress the fingers sufficiently to allow a nut to be readily started on the threads of the bolt by hand.

Figure 1:
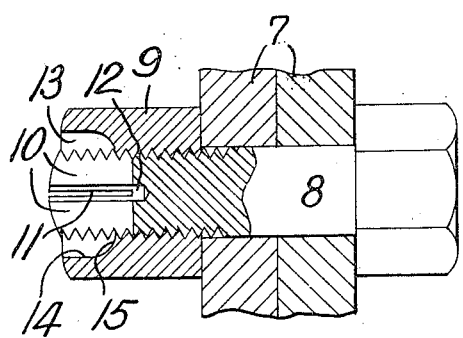
Figure 2:
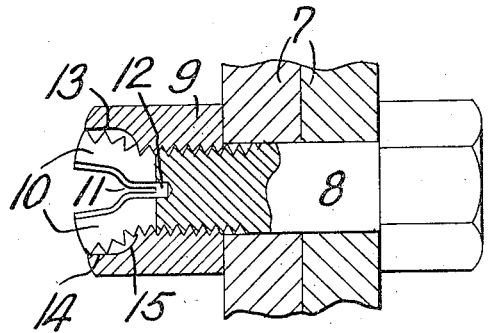
Figure 3:
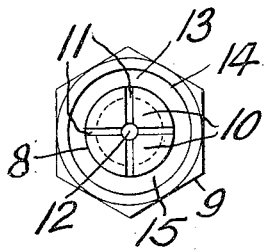
Figure 6:
Figure 4:
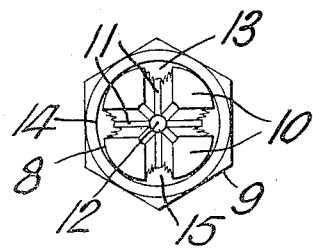
Figure 5:
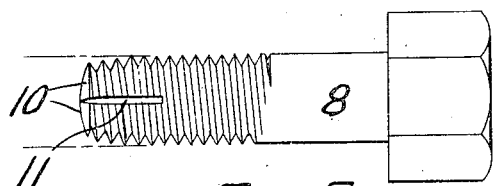

In the drawings which illustrate this invention:—Figure 1 is a sectional view showing the nut as screwed down on the bolt. Fig. 2 is a similar view showing the fingers of the bolt expanded to lock the nut in place. Fig. 3 is a plan view of the nut with the bolt in place, the fingers being unexpanded. Fig. 4 is a similar view showing the bolt fingers expanded. Fig. 5 is a plan view of a bolt as it appears after the nut has been screwed off. Fig. 6 is a plan view of the point of a tool suitable for expanding the bolt fingers.

Referring to the drawings, 7 designates a pair of members through which the bolt 8 passes, and which are held in place by the nut 9. The body and head of the bolt are of the usual form and may be made by any of the known processes. The threaded end of the bolt is formed into a plurality of fingers 10 by means of cuts 11 extending diametrically through the bolt. At the point where these cuts 11 intersect, i. e., the longitudinal axis of the bolt, a small hole 12 is formed, which hole preferably extends a short distance below the bottom of the cuts 11, as seen in Figs. 1 and 2. The nut is of the usual external form and internally threaded to fit the bolt. The outer portion of the nut is provided with a circular recess 13 concentric with the bolt aperture. This recess is cylindrical or very nearly so for a short distance into the nut, as seen at 14, and then converges in a curve until it meets the bolt aperture, as seen at 15.

In order that the nut may have the usual number of threads engaging the bolt, it is made extra thick, the additional thickness being equal to the depth of the recess 13. When the nut is screwed into place on the bolt, the fingers 10 of the bolt lie within the recess of the nut, thus leaving a solid portion of the bolt engaging the threaded portion of the nut, so that there is no weakening of the bolt.

When in use, the bolt is placed in position and the nut screwed down tight in the usual manner. A suitable tool, shaped for instance as shown in Fig. 6, is introduced into the aperture 12 of the bolt and driven in so as to expand the fingers 10 to fill the recess 13 in the nut. By reason of the shape of the tool, the fingers are not merely flared outwardly but are pressed to conform to the interior of the recess. The reason for this particular shaping of the fingers is that when the nut is forcibly screwed off, the extremities of the fingers will come together before the fingers are entirely straightened out, and thus leave the tip of the bolt slightly smaller than the usual diameter, so that a nut may be readily started on the threads by hand. It is obvious that if these fingers were merely flared out in a straight line, that when the nut was forced off, thus compressing the fingers, there would be enough spring in the metal to cause the fingers to extend slightly, thus making the tip of the bolt slightly larger than normal so that great difficulty would be experienced in starting another nut.

When the fingers are extended, as seen in Fig. 2, they will effectually hold the nut against revolution, as any revolution of the nut due to vibration is in a reverse or unscrewing direction, which is also an outward direction. Should the members 7 become worn under nut or bolt head, and thus loose, the nut may be tightened up in the usual manner and locked in this tightened position, extending the fingers a trifle more.

Having thus described my invention, I declare that what I claim is:—

A device of the character described comprising a bolt having the threaded end thereof split into a plurality of fingers, and a nut coöperating with said bolt having a recess in the outer face thereof for the reception of the bolt fingers, said recess being substantially cylindrical at its outer end and converging in a curve at the bottom.

In witness whereof I have hereunto set my hand in the presence of two witnesses.

ARCHIBALD A. MacDONALD.

Witnesses:
STUART R. W. ALLEN,
C. C. CARROLL.